W. W. RICHARDSON.
APPARATUS FOR CLASSIFYING AND CONCENTRATING MINERALS, ORES, AND THE LIKE, ALSO APPLICABLE TO THE REQUIREMENTS OF MINERAL DREDGING.
APPLICATION FILED JULY 7, 1919.
1,374,472.
Patented Apr. 12, 1921.
4 SHEETS—SHEET 1.
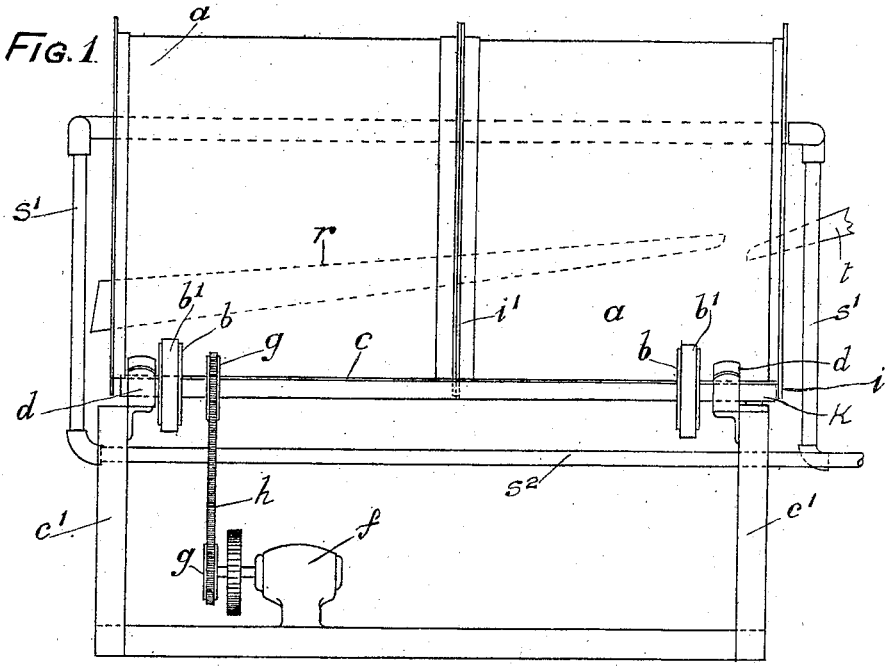
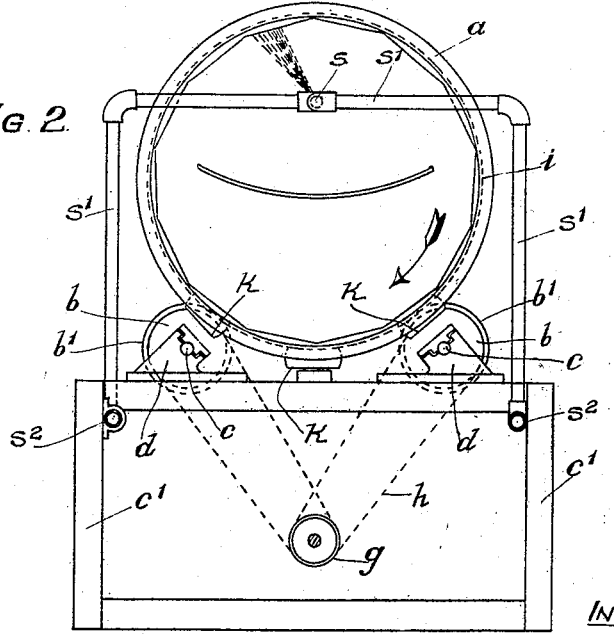
INVENTOR
WILLIAM WHITEHEAD RICHARDSON
PER:- Rayner & Co
ATTORNEYS.

W. W. RICHARDSON.
APPARATUS FOR CLASSIFYING AND CONCENTRATING MINERALS, ORES, AND THE LIKE, ALSO APPLICABLE TO THE REQUIREMENTS OF MINERAL DREDGING.
APPLICATION FILED JULY 7, 1919.

1,374,472.
Patented Apr. 12, 1921.
4 SHEETS—SHEET 2.

INVENTOR
WILLIAM WHITEHEAD RICHARDSON
PER:
Rayner & Co
ATTORNEYS.

W. W. RICHARDSON.
APPARATUS FOR CLASSIFYING AND CONCENTRATING MINERALS, ORES, AND THE LIKE, ALSO APPLICABLE TO THE REQUIREMENTS OF MINERAL DREDGING.
APPLICATION FILED JULY 7, 1919.

1,374,472.

Patented Apr. 12, 1921.
4 SHEETS—SHEET 3.

INVENTOR.
WILLIAM WHITEHEAD RICHARDSON.
PER:— Rayner & Co.
ATTORNEYS.

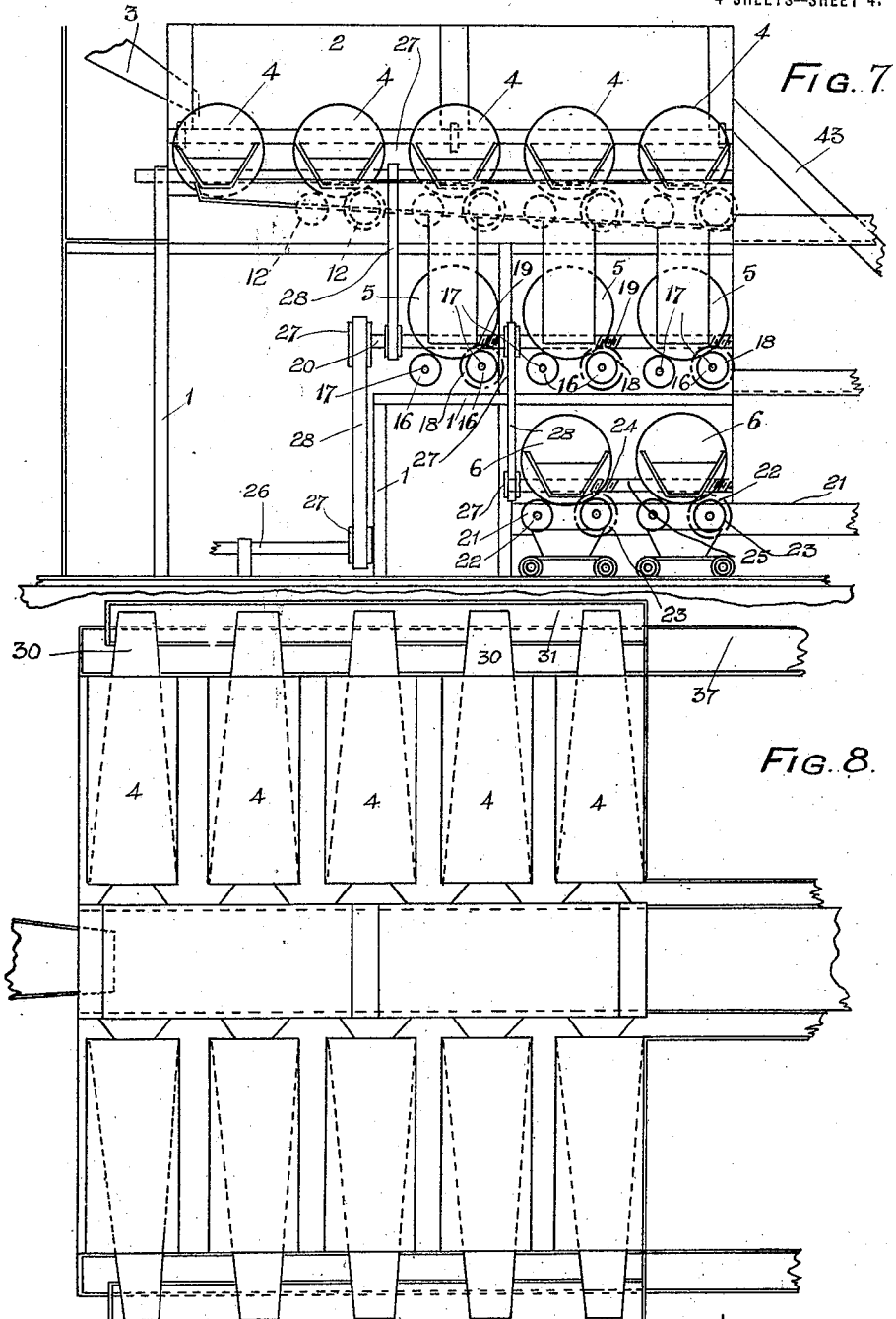

UNITED STATES PATENT OFFICE.

WILLIAM WHITEHEAD RICHARDSON, OF LONDON, ENGLAND.

APPARATUS FOR CLASSIFYING AND CONCENTRATING MINERALS, ORES, AND THE LIKE, ALSO APPLICABLE TO THE REQUIREMENTS OF MINERAL-DREDGING.

1,374,472.   Specification of Letters Patent.   Patented Apr. 12, 1921.

Application filed July 7, 1919. Serial No. 309,164.

*To all whom it may concern:*

Be it known that I, WILLIAM WHITEHEAD RICHARDSON, subject of the King of Great Britain and Ireland, residing at 4 London Wall Buildings, London, in the county of London, England, have invented certain new and useful Improvements in Apparatus for Classifying and Concentrating Minerals, Ores, and the like, also Applicable to the Requirements of Mineral - Dredging, of which the following is a specification.

The present invention relates to apparatus for classifying and concentrating minerals, ores or the like and has for its object to provide apparatus whereby a more effective grading or separation of the different values is obtained.

An important feature of the invention consists in an improved method of supporting and rotating the trommel which permits the degree of inclination of the trommel to be easily and quickly altered if necessary to suit the material under treatment while a further feature of the invention consists in providing the inner periphery of the trommel with a series of riffle plates arranged in sections, each section being formed on its inner face with a series of graduated longitudinal grooves and ridges designed to offer a greater resistance to excessive wear. These ridges and grooves are intersected by a series of transverse grooves and ridges, some of which extend at right angles while others are arranged at an obtuse angle to the longitudinal grooves, in order to obtain a more effective concentation and separation of the material under treatment.

A further feature of the invention consists in the adaptability of the improved construction of trommel and the method of driving same to the requirements of mineral dredging and consists in arranging the trommels in groups or series superimposed one above the other, through which the material under treatment is successively passed, whereby the minerals are reduced and/or graded and automatically extracted from a continuous flow of alluvial gravel, the concentrate being enriched by its passage through each series or group of concentrators, until finally it is received as a clean mineral, the debris from each series of trommels being conveyed to a dump by separate launders.

In order that the invention may be readily understood reference is made to the accompanying drawings in which:—

Figure 1 is a longitudinal elevation, and Fig. 2 an end view of a trommel showing the improved means for supporting and driving same, when used for treating alluvial ores.

Figs. 6, 7 and 8, are diagrammatic views showing the invention applied to a plant for treating material raised by dredges, Fig. 6 being an end elevation partly in section, Fig. 7 a side elevation also partly in section, and Fig. 8 a plan, while

Referring to Figs. 1 and 2, the trommel $a$ which may be built up of any convenient number of sections is arranged to rotate about a horizontal axis and is supported by two or more pairs of driving wheels $b$, $b$, each provided with a rubber tire or rim $b^1$, arranged on each side of the trommel. These driving wheels are carried by shafts $c$ extending the whole length of, and approximately parallel with, the trommel, said shafts being supported at or near each end in suitable bearings or plummer blocks $d$ adjustably mounted on the frame $c^1$, constituting the lower portion of the apparatus. Either one or both of the shafts carrying the driving wheels may be driven from a motor or the like $f$ through the sprocket wheels $g$ and chain $h$, or any other suitable driving means may be employed.

The longitudinal axis of the trommel may if necessary be inclined to the horizontal by increasing the distance between the bearings or plummer blocks $d$ at the discharge end of the machine, or the two sets of driving wheels at each end of the trommels may be mounted on separate shafts.

The feed end of the trommel is provided with an outwardly projecting annular flange or rim $i$ which may be formed by angle iron as shown or in any other suitable manner.

This flange is adapted to rotate in contact with a series of thrust idlers or rollers $k$ rotatably mounted on a sole plate secured to the frame $c^1$ and serves to prevent axial movement of the trommel.

Figure 5:
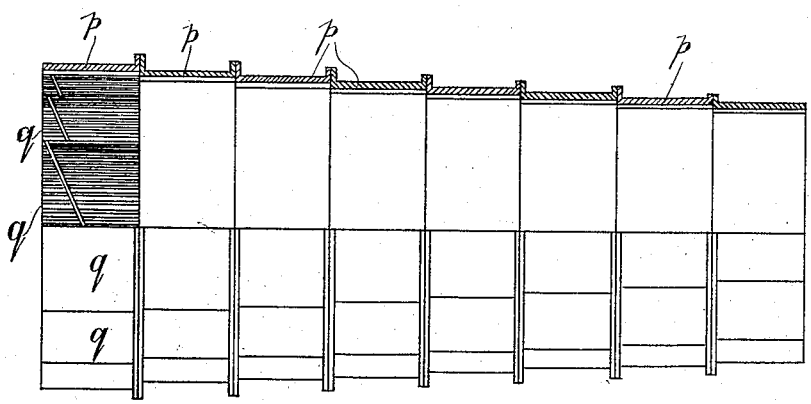
Fig. 5 is a view partly in section of the riffle plates arranged in stepped formation for use in concentrators for the treatment of comminuted ores.
Figure 3:
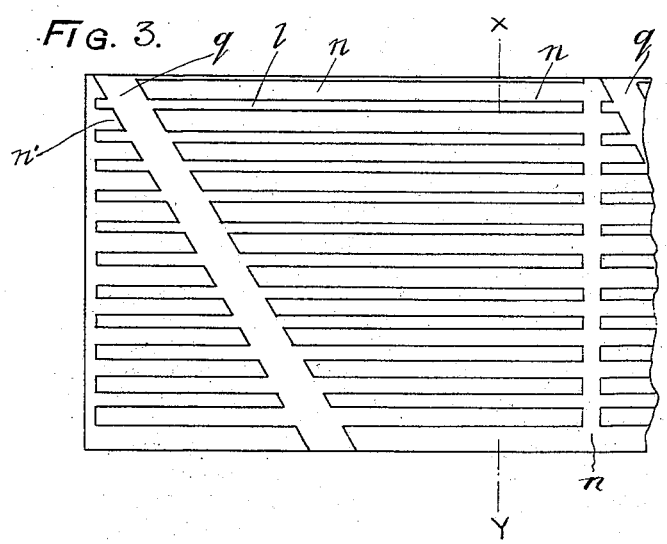
Fig. 3 is an enlarged view of part of a riffle plate with which the trommel is lined.

The inner periphery of the trommel is lined with riffle plates, Fig. 3, whose inner surfaces form the selecting surfaces of the concentrator. These plates, which may be made of non-corrosive tempered steel, or mild steel, cast iron, manganese steel, or any other suitable material, are provided along their inner surfaces with a series of longitudinal graduated grooves or channels $l$. These grooves are so arranged that the width of the ridges $n$ formed between each pair of grooves is greater than the width of the grooves, in order to obtain the maximum resistance to excessive wear, and starting from the forward moving edge of the plates, each groove gradually increases in width and depth up to the following edge of the plate so that graduated classification and effective concentration of the dirt and minerals is obtained. Each section of the riffle plates is also formed with transverse ridges $n^1$ extending approximately at right angles to the longitudinal grooves and with grooves $q$ extending at an obtuse angle to said longitudinal grooves thus forming a series of vortices which enables a more effective mechanical separation and concentration of the minerals to be produced.

The material carried around on the inner surfaces of the riffle plates is washed off by a spray of water from the stationary pipe $s$. This pipe is supplied with water under pressure through the pipes $s^1$ and service pipes $s^2$ mounted on the frame, and is provided with a series of perforations or holes in one or more rows along its length arranged so as to cause jets of water to be directed against the upper surface of the riffle plates as shown in Fig. 2.

Figure 4:
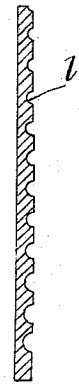
Fig. 4 is a cross section on the line X—Y of Fig. 3.

When the apparatus is constructed for use in connection with comminuted ores, the sections of riffle plates are formed in a similar manner, but are arranged to increase in diameter from the feed end toward the discharge end as shown in Fig. 4 forming a series of steps, and producing a more effective precipitation of the mineral values.

The trommel may be provided with one or more troughs or trays $r$ (Fig. 1) and with a delivery chute $t$ projecting into the feed end of the trommel $a$. If more than one trough or tray is used, they may be arranged in such a manner that the lowermost tray projects the greatest distance within the trommel while the uppermost tray projects the shortest distance therein.

The troughs $r$ may be arranged so that the material washed from the grooved inner periphery of the trommel onto the trays is discharged at opposite ends of the trommel the coarser particles toward one end and the finer particles toward the opposite end. In this case the trays slope downwardly toward the opposite ends while longitudinal movement of the trommel is prevented by the provision of two or more sets of thrust rollers engaging opposite sides of the central annular flange or rim $i^1$ or the inner face of the flanges or rims $i$ on each end of the trommel.

Figure 6:
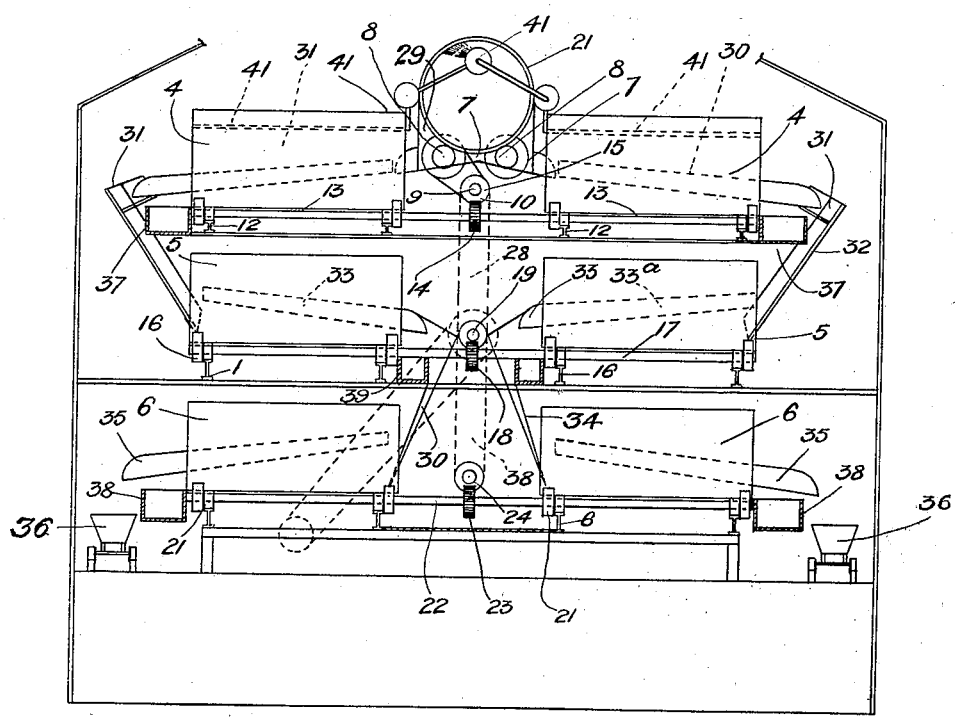

Referring now to Figs. 6, 7 and 8, which show the application of the invention to a plant for treating materials raised by a dredge, the apparatus comprises a suitable staging or framing 1 on the deck of a dredger, pontoon or the like vessel. The crude material is delivered in to the central perforated trommel 2, mounted on the upper portion of the staging, by buckets or gravel pumps through the chute 3. The central trommel 2 preferably extends longitudinally of the frame, while the three groups of trommel concentrators 4, 5 and 6, respectively, are arranged in tiers at approximately right angles to, and on each side of the central trommel. The inner periphery of each of the trommels 4, 5 and 6, is lined with riffle plates as hereinbefore described.

The central trommel is supported and rotated by a series of wheels or disks 7 fixedly mounted on shafts 6 disposed on each side of the trommels and parallel therewith, said shafts rotating in suitable bearings fixed to the frame 1.

Figure 9:
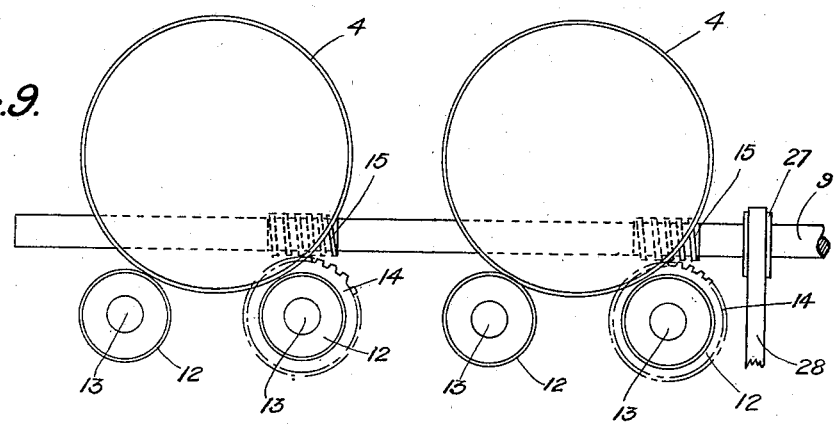
Fig. 9 is a detail view showing the method of imparting rotation to the trommels.

One or both the shafts 8 is driven from a driving shaft 9 through sprocket wheels 10 and chains 11, or by any other convenient means. Each of the trommels 4 of the first series or group are supported on wheels or disks 12 secured to shafts 13, one or both of which carries a worm wheel 14 engaging a worm 15 on the driving shaft 9 (Fig. 9). The trommels of the second series or group are supported on wheels 16 mounted on shafts 17 one or both of which has a worm wheel 18 driven by a worm 19 on the driving shaft 20, while the trommels 6 of the third series or group are supported by wheels 21 on shafts 22, one or both being driven through worm wheel 23 and worm 24 on the driving shaft 25. The driving shafts 9, 20, and 25 are driven from the shaft 26 by a motor or other suitable source of power, through pulley wheels 27 and belts 28 as will be readily understood. If necessary pinion wheels or friction wheels may be substituted for the worm drive.

The central trommel 2 is perforated over either the whole of or part of its periphery, the size of perforations being such as to permit spheres or the like of a predetermined size to pass through. Beneath this trommel is a trough or channel 29 extending the whole length of the trommel, the sides of which have suitable apertures or ports to enable the material to be fed into the inner ends of the trommels 4. The bottom of the trough is inclined downwardly toward each side as shown in Fig. 1. Extending within each of the trommels 4 is a tray or trough 30 into which the material washed off the inner periphery of the trommel is delivered. The outer ends of these trays terminate above longitudinal launders 31 which are inclined slightly toward one end and are provided with downwardly extending chutes 32 terminating at their lower ends within each of the trommels 5 of the second series or group, the concentrate or selected material from the first series being delivered at the outer ends of said trommels. The passages or openings from the launders 31 to the chutes 32 are preferably arranged in such a manner as to enable the opening to be adjusted or varied to regulate the flow of material therethrough as desired.

Extending within each of the trommels 5 are trays or troughs 33 downwardly inclined toward the inner ends of the trommels, and terminating at their lower ends above longitudinal launders from which extend downwardly, chutes 34 through which the mineral values are conveyed to the inner ends of the trommels 6 of the third series or group. The trommels 6 are also provided with trays or troughs 35 inclined toward their outer end, the extreme ends projecting beyond the ends of the trommels 6, suitable trucks 36 or similar bins being provided to receive the mineral values from said trays.

The debris discharged from the outer ends of the trommels 4 and 6 falls into the launders 37 and 38, respectively, through which the material is conveyed to the dump, while the debris or unselected material from the second group of trommels is conveyed to the dump by launders 39 arranged beneath the inner ends of said trommels.

Within the central trommel 2, and each of the trommels 4, 5 and 6, is mounted a water spraying device which extends longitudinally over the whole length of the perforated portion of the trommel 2, and over at least the whole length of the troughs or trays 30, 33, 35, of the trommels 4, 5, 6, respectively. The spraying device comprises a longitudinal trough within which is rotatably mounted a propeller like device. The trough is provided with an adjustable cover hinged thereto in such a manner as to permit the width of the gap or longitudinal opening between the trough and the cover through which the water is projected on to the upper internal surface of the trommel, to be adjusted. The trough is preferably carried by and supplied with water from a suitably arranged pipe. These troughs may if necessary be replaced by perforated water pipes partly shown in the drawings at 40 and 41 in Fig. 6.

The operation of the apparatus is as follows:—

The crude material delivered by the buckets or pump of the dredger is conveyed down the chute 3 into one end of the central trommel 2. The rotation of the latter, which causes the material to be constantly turned over, results in the spheres of smaller sizes falling through the perforations into the trough or channel 29 from which they are conveyed into the inner ends of the trommels 4 arranged on each side, the larger spheres being carried through the trommels to the chute 43 or by a conveyer or other suitable form of transporter to the dump.

The mineral values and a portion of the gravel of suitable size to include the maximum size of mineral values is carried around by the rotation of the trommels 4 and washed off the surface thereof into the trays 30 which lead the concentrates into the trommels 5 of the second series or group through the launders 31 and chutes 32. The oversize of gravel is carried by the water from the trommels 4 into the launders 37 to the dump. The trommels 5 of the second series gradually enrich the concentrate which is washed off the inner surface of the trommels on to the trays 33 where it is conveyed down the chutes 34 into the inner end of the trommels 6 of the third series or group, the debris flowing through the launders 30 and away to the dump. The final separation of the minerals from the sand or gravel is made in the trommels 6 of the third series, the concentrate now in the form of a clean mineral being delivered into the trucks 36 from the outer ends of the trays 35.

The trommel 2, instead of being perforated, may if necessary be provided with a grooved inner surface as hereinbefore described, in which case the tray or trays conveying the selected material would be arranged to lead such material to the longitudinal trough 29.

The worm gear drive on each of the driving shafts may be slidably keyed thereto so as to enable the rotation of any of the trommels to be stopped if desired. The worm gear drive, may if necessary be replaced by pinion or friction wheel driving mechanism or the various shafts may be directly driven from the main driving shaft.

It will be understood that the number of trommels in each series or group may be increased or decreased to suit the output desired while the trommels may be arranged at any other angle than at right angles to the axis of the center trommel.

The trommels of each series may also if necessary be placed in one plane as shown, or superimposed in one or more tiers.

What I claim as my invention and desire to obtain by Letters Patent is:—

1. Apparatus for classifying and concentrating mineral ores comprising at least one trommel, riffle plates on the interior surface of said trommel, said riffle plates having a series of graduated ridges and grooves on their surfaces, arranged longitudinally of the trommel, the width over the ridges being greater than the width over the grooves, while the width and depth of the grooves increase from the forward moving edge of each riffle plate.

2. Apparatus for classifying and concentrating mineral ores comprising at least one trommel, riffle plates on the interior surface of said trommel, said riffle plates having a series of graduated ridges and grooves on their surfaces, arranged longitudinally of the trommel, the widths and depths of the individual grooves increasing from the forward moving edge of each riffle plate while the ridges between said grooves are of greater width than the grooves, and additional ridges disposed substantially at right angles to the longitudinal grooves.

3. Apparatus for classifying and concentrating mineral ores comprising at least one trommel, riffle plates on the interior surface of said trommel, said riffle plates having a series of graduated ridges and grooves on their surfaces arranged longitudinally of the trommel, the widths and depths of the individual grooves increasing from the forward moving edge of the plate, while the ridges between said grooves are of greater width than the grooves and additional grooves disposed at an obtuse angle to said graduated longitudinal grooves.

4. Apparatus for classifying and concentrating mineral ores comprising at least one trommel, riffle plates on the interior surface of said trommel, said riffle plates having a series of graduated grooves on their surfaces arranged longitudinally of the trommel, the widths and depths of the individual grooves increasing from the forward moving edge of the plate, while ridges between said grooves are of greater width than the grooves and additional grooves disposed substantially at right angles to the longitudinal grooves and additional grooves disposed at an obtuse angle to said graduated longitudinal grooves.

5. Apparatus for classifying and concentrating mineral ores comprising at least one trommel, riffle plates on the interior surface of said trommel, said riffle plates having a series of grooves on their surfaces arranged longitudinally of the trommel, the widths and depths of the individual grooves increasing from the forward moving edge of the riffle plate, and means for rotating said trommel.

6. Apparatus for classifying and concentrating mineral ores comprising at least one trommel, riffle plates on the interior surface of said trommel, said riffle plates having a series of graduated grooves on their surfaces arranged longitudinally of the trommel, the widths and depths of the individual grooves increasing from the forward moving edge of the riffle plate while the ridges between said grooves are of greater width than the grooves, additional ridges disposed substantially at right angles to the longitudinal grooves and means for rotating said trommel.

7. Apparatus for classifying and concentrating mineral ores comprising at least one trommel, riffle plates on the interior surface of said trommel, said riffle plates having a series of graduated grooves on their surfaces arranged longitudinally of the trommel, the widths and depths of the individual grooves increasing from the forward moving edge of the riffle plate while the ridges between said grooves are of greater width than the grooves, additional ridges disposed substantially at right angles to the longitudinal grooves, additional grooves disposed at an obtuse angle to said graduated longitudinal grooves, and means for rotating said trommel.

8. Apparatus for classifying and concentrating mineral ores comprising at least one trommel, riffle plates on the interior surfaces of said trommel, said riffle plates arranged in stepped formation having a series of graduated grooves on their surfaces, arranged longitudinally of the trommel, the widths and depths of the individual grooves differing from one another, ridges between said longitudinal grooves of greater width than the grooves and means for rotating said trommel.

9. Apparatus for classifying and concentrating mineral ores comprising at least one trommel, riffle plates on the interior surface of said trommel, said riffle plates arranged in stepped formation having a series of graduated grooves on their surfaces, arranged longitudinally of the trommel, the widths and depths of the individual grooves differing from one another, ridges between said longitudinal grooves of greater width than the grooves, additional ridges disposed substantially at right angles to the longitudinal grooves and additional grooves disposed at an obtuse angle to said graduated longitudinal grooves.

10. Apparatus for classifying and concentrating mineral ores comprising at least one trommel, riffle plates on the interior surface of said trommel, said riffle plates arranged in stepped formation having a series of graduated grooves on their surfaces, arranged longitudinally of the trommel, the widths and depths of the individual grooves differing from one another, ridges between said longitudinal grooves of greater width than the grooves, additional ridges disposed substantially at right angles to the grooves, additional grooves disposed at an obtuse angle to said graduated longitudinal grooves, and means for rotating said trommel.

11. Apparatus for classifying and concentrating mineral ores comprising at least one trommel, riffle plates on the interior surface of said trommel, said riffle plates having a series of graduated grooves on their surfaces arranged longitudinally of the trommel, the widths and depths of the individual grooves differing from one another, ridges between said grooves of greater width than the grooves, means for rotating said trommel, the smallest grooves being disposed at the leading edges of the plates, and stationary inclined trays within said trommel for collecting the selected material.

12. Apparatus for classifying and concentrating mineral ores comprising at least one trommel, riffle plates on the interior surface of said trommel, said riffle plates arranged in stepped formation having a series of graduated grooves on their surfaces arranged longitudinally of the trommel, the widths and depths of the individual grooves differing from one another, ridges between said grooves of greater width than the grooves, additional ridges disposed substantially at right angles to the longitudinal grooves, additional grooves disposed at an obtuse angle to said graduated longitudinal grooves, and inclined trays within said trommel for collecting the selected material.

13. Apparatus for classifying and concentrating mineral ores comprising a plurality of trommels arranged in groups, riffle plates on the interior of said trommels, each of said riffle plates having a series of ridges and grooves on their inner surfaces arranged longitudinally of the trommel, the width over the ridges between the grooves being greater than the width over the grooves, means for rotating said trommels, trays stationary within each of said trommels for collecting the selected material and means for transferring the mineral values from the trays in one group to the selecting surfaces on the interior of the trommels of the next group.

14. Apparatus for classifying and concentrating mineral ores comprising a plurality of trommels arranged in groups, said groups being superimposed one above the other, riffle plates on the interior of said trommels, each of said riffle plates having a series of ridges and grooves on their inner surfaces arranged longitudinally of the trommel, the width over the ridges between the grooves being greater than the width over the grooves, means for rotating said trommels, trays stationary within each of said trommels for collecting the selected material, and means for transferring the mineral values from the trays in one group, to the selecting surfaces of the trommels of the next group below.

WILLIAM WHITEHEAD RICHARDSON.